March 11, 1958 — W. J. WITTICK — 2,826,088
STEERING ATTACHMENT FOR THE TILLER OF AN OUTBOARD MOTOR
Filed April 19, 1954
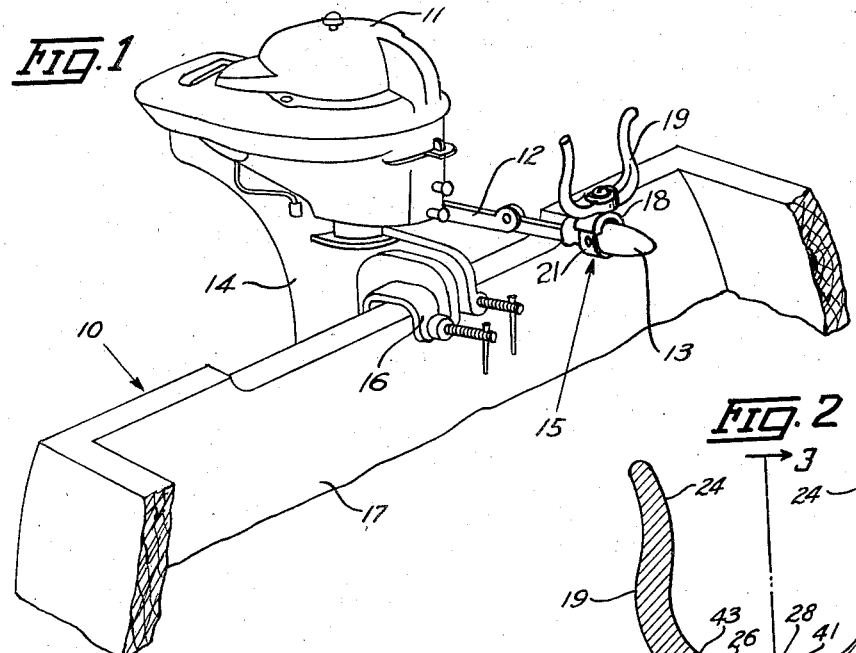
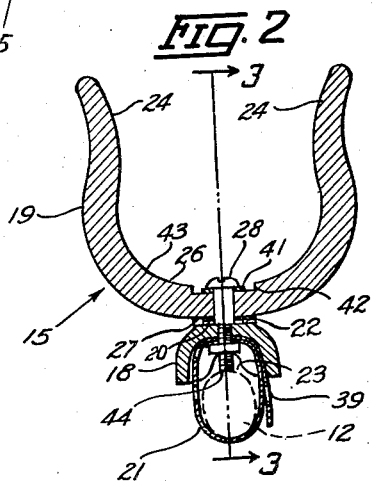
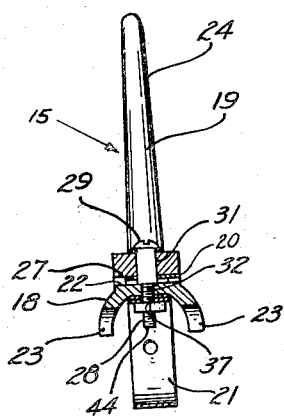
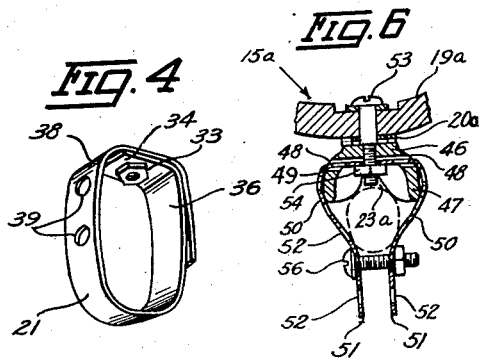
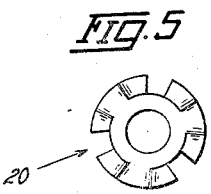
INVENTOR.
WALTER J. WITTICK
BY Rudolph L. Lowell
ATTORNEY.

# United States Patent Office 2,826,088
Patented Mar. 11, 1958

2,826,088

STEERING ATTACHMENT FOR THE TILLER OF AN OUTBOARD MOTOR

Walter J. Wittick, Cambridge, Iowa

Application April 19, 1954, Serial No. 423,941

1 Claim. (Cl. 74—479)

This invention relates generally to tillers for outboard motors and in particular to an arm-steering attachment for the tillers.

Outboard motors, commonly used for fishing boats and the like, generally include a tiller which is gripped in one hand and then manipulated for boat steering purposes. When the boat is in movement during fishing, the motor operator merely holds the tiller in one hand, and a fish rod in the other hand. However, should he get a strike, both hands are required on the fish rod so that the motor must either be stopped, or the tiller maintained in a set position as by the operator throwing his leg over the tiller. Either procedure involves appreciable inconvenience and the loss of a free maneuverability not only of the boat, but of the fish rod and reel therefor.

It is an object of this invention, therefore, to provide an arm-steering attachment for the tiller of an outboard motor.

Another object of this invention is to provide an arm-steering attachment for the tiller of an outboard motor which is of a simple construction, easily and quickly installed on most any tiller regardless of the type of outboard motor, and capable of providing for a convenient steering of the boat while leaving both hands of the motor operator free for the handling of a rod and reel, the securing of a bait to the line and like fishing maneuvers.

Further objects, features and advantages of this invention will become apparent from the following description when taken in connection with the accompanying drawing in which:

Fig. 1 is a fragmentary perspective view of the rear end of a boat, showing an outboard motor having the steering attachment of this invention assembled on the tiller thereof;

Fig. 2 is an enlarged longitudinal sectional view of the steering attachment;

Fig. 3 is a sectional view as seen on the line 3—3 in Fig. 2;

Fig. 4 is an enlarged perspective view of a clamping band which forms part of the attachment of this invention;

Fig. 5 is an enlarged elevational view of a spring washer which forms part of the attachment of this invention; and Fig. 6 is an enlarged fragmentary longitudinal sectional view of a modified form of the steering attachment of this invention, illustrated similarly to Fig. 2.

With reference to the drawing there is illustrated in Fig. 1 a boat 10 equipped with an outboard motor 11 having a tiller or steering lever 12 provided with a hand grip 13. As is well known, the motor 11 is rotatable on a base 14, which is clamped as at 16, to the rear end 17 of the boat 10. For steering purposes the entire motor 11 is rotated in response to a movement of the tiller 12 in a horizontal plane.

The arm-steering attachment of this invention, designated generally at 15, is shown in Figs. 2 and 3 as including a base member 18, a U-shape bracket 19, and a flexible clamping band 21. The base member 18 is of a substantially dome shape having a flat top surface 22 and a bottom side, formed with a pair of oppositely arranged arcuate recesses or notches 23.

The bracket 19 has the leg sections 24 thereof of a length and spaced apart a distance so as to comfortably receive an arm therebetween. The base section 26 of the bracket or U-member 19 is formed at the central portion of its underside with a flat surface 27 for resting or bearing engagement with a spring washer 20 (Figs. 2 and 5) arranged between the surface 27 and the top surface 22 of the base member 18. To rotatably support the bracket 19 for rotation relative to the base member 18 there is provided a screw 28 extended through the base section 26 at the bearing surface 27, and through the base member 18 at its flat top surface 22. The screw 28 has a head member 29 and a shank portion integrally formed with a bearing member 31 and a reduced threaded section 32, with the bearing section 31 being of a length to extend through the base section 26, and washer 20 and with the threaded section 32 being extended into the base member 18.

As shown in Fig. 4 the clamping band 21 is formed of a flat flexible material and has a nut 33 welded at one end 34 so as to project laterally from one side 36 thereof, with the nut 33 being in co-axial alignment with an opening 37 formed at the band end 34. The other end section 38 of the band 21 is formed with a series of spaced holes 39 which are selectively aligned with the hole 37 in the band end 34. Thus on aligning one or the other of the holes 39 with the opening 37 the size of the band 21 is readily changed, and with this adjustment taking place by virtue of the overlapping relation of the end section 38 with the end 34 of the band.

The overlapped portion of the band 21 is received within the base member 18, from the underside thereof, and the threaded section 32 of the screw 28 is extended through a hole 39, and the hole 37 for threaded engagement with the nut 33. On tightening of the screw 28 the surface portions 22 and 27 are brought into bearing engagement with opposite sides of the spring washer 20, and with the length of the bearing section 31 limiting the compression of the washer 20 to the desired amount when the nut 33 is tight. In other words, when the nut 33 is tight the bearing engagement of the washer 20 with the surface portion 27 of bracket 19 yieldably restrains a free rotation of the bracket 19 about the bolt bearing portion 31. The screw head 29 and a locking washer 41 for the screw 28 (Fig. 2) are positioned within a recess 42 formed in the top side 43 of the base section 26 so as to be substantially within the dimensional confines of the base section 26.

In the assembly of the attachment 15 with the tiller 12, the clamping band 21 is initially adjusted so as to fit snugly about the tiller. The base member 18 is then positioned over the overlapped portion of the band 21 with the arcuate recesses 23 arranged transversely of the tiller. On tightening of the screw 28 within the nut 33 the terminal end 44 of the screw engages the tiller, which is indicated in dotted lines in Fig. 2, whereby to draw the clamping band 21 into positive frictional engagement with the tiller.

For steering purposes, the arm of the motor operator is received between the legs 24 of the bracket 19, in a supported position on the base section 26. By virtue of the rotatable support of the bracket 19 on the base member 18, for rotation in a plane extended longitudinally of the tiller 12, the tiller 12 is freely movable while permitting a free use of both hands of the motor operator. As a result of the yieldable restraining action of the washer 20 on the bracket 19, a positive control of the tiller 12 is maintained even when a fishing operation requires the use of both of the operator's hands on his fish rod and a consequent rotation of the bracket 19 relative to the tiller 12.

In the modified form of steering attachment shown in Fig. 6, and indicated generally at 15a, the U-shape bracket 19a is identical with the U-shape bracket 19 of the attachment 15. The base member 46 for the attachment 15a is indentical with the base member 18 for the attachment 15, except that the transversely spaced legs 47 of the base member 46 are provided at their upper ends with laterally extended slots 48. Parts of the attachment 15a which are identical with like parts on the attachment 15 are therefore designated with like numerals having the suffix "a."

Inserted through the slots 48 in the base 46 is a clamping member 49, formed of a flat flexible material, and having a series of openings 52 spaced longitudinally of the member 49. End portions 50 of the member 49 are extended downwardly along the outer sides of the base member legs 47 so that their terminal ends 51 are positioned opposite each other below the base member 46. A bolt 53 projected downwardly through the bracket 19a, washer 20a, base member 46 and a central one of the openings 52 in the clamp member 49 has a nut 54 engageable with the lower side of the clamping member 49 to maintain these parts in assembly relation.

In the assembly of the attachment 15a with the tiller 12, the portions 50 of the clamping member 49 are arranged on opposite sides of the tiller 12 with the arcuate recesses 23a in the base member 46 arranged transversely of the tiller. A bolt 56 is extended through a pair of transversely aligned openings 52 in the clamping member 49 below and adjacent to the tiller 12. Upon tightening of the bolt 56 the portions 50 of the clamping member 49 are drawn into positive frictional engagement with the tiller 12 to firmly clamp the tiller 12 between the base member 46 and the portions 50 of the clamping member 49 below the legs 47 of the base 46.

The attachment 15a is used with the tiller 12 in a manner identical to that above described in connection with the use of the attachment 15.

Although the invention has been described with respect to several embodiments thereof, it is to be understood that it is not to be so limited since changes can be made therein which are within the full intended scope of this invention as defined by the appended claim.

I claim:

For use with the tiller of an outboard motor, an arm-steering attachment for said tiller comprising a base member having an arcuate recessed portion in the lower side thereof for resting on the tiller, a U-shape arm-receiving member having leg sections and a base section, means for rotatably supporting said U-member at the base section thereof on said base member for rotation in a plane extended longitudinally of said tiller, and means for securing said base member to said tiller.

References Cited in the file of this patent

UNITED STATES PATENTS

| | | |
|---|---|---|
| 2,101,519 | Thorp | Dec. 7, 1937 |
| 2,118,540 | Van Arsdel | May 24, 1938 |
| 2,543,490 | England | Feb. 27, 1951 |
| 2,553,204 | Murphy | May 15, 1951 |

FOREIGN PATENTS

| | | |
|---|---|---|
| 479,565 | Great Britain | Feb. 8, 1938 |